United States Patent [19]

Kim

[11] 4,404,865
[45] Sep. 20, 1983

[54] TRACKBALL DEVICE

[75] Inventor: Snyg N. Kim, Hoffman Estates, Ill.

[73] Assignee: Wico Corporation, Niles, Ill.

[21] Appl. No.: 347,469

[22] Filed: Feb. 10, 1982

[51] Int. Cl.³ .................. F16H 13/00; G05G 9/00; G05G 13/00
[52] U.S. Cl. ................... 74/471 XY; 74/209; 273/DIG. 28
[58] Field of Search .............. 74/209, 471 R, 471 XY; 362/311; 308/184 R, 203, 204

[56]     References Cited
       U.S. PATENT DOCUMENTS

| 487,236 | 0/1892 | Burton | 308/203 |
|---|---|---|---|
| 2,544,587 | 3/1951 | Cloud | 74/209 |
| 2,792,502 | 5/1957 | O'Connor | 74/471 |
| 2,869,429 | 1/1959 | Wetzel | 74/471 XY |
| 3,269,190 | 8/1966 | Laman | 74/471 XY |
| 3,395,589 | 8/1968 | Gersten | 74/471 XY |
| 3,467,451 | 9/1969 | Marley | 308/184 R |
| 3,620,583 | 11/1971 | Koprowski | 308/184 R |
| 3,625,083 | 12/1971 | Bose | 74/471 XY |
| 3,643,148 | 2/1972 | Brown et al. | 74/471 XY |
| 3,694,648 | 9/1972 | Yates | 362/311 |
| 3,957,144 | 5/1976 | Opyrchal | 308/184 R |
| 4,118,762 | 10/1978 | Fennell | 362/311 |
| 4,206,501 | 6/1980 | Brooks | 362/311 |
| 4,270,162 | 5/1981 | Cherouge | 362/311 |

Primary Examiner—Lawrence J. Staab
Assistant Examiner—Michael Bednarek
Attorney, Agent, or Firm—Dithmar, Stotland, Stratman & Levy

[57]     ABSTRACT

A trackball device includes a housing containing a plurality of rotatable supports and a ball seated thereon with a portion of the ball projecting through an opening in the housing for manual rotation by a user. First and second ones of the supports comprise shafts respectively rotatable about orthogonally related axes, the shafts being rotatably mounted in bearings receivable in slots in the housing accommodating slight movement thereof in directions perpendicular to the plane of the ball opening. Bias springs resiliently urge the bearings, and thereby the shafts and ball toward the ball opening. The device may also include illumination means and a light-transmitting ball.

12 Claims, 7 Drawing Figures

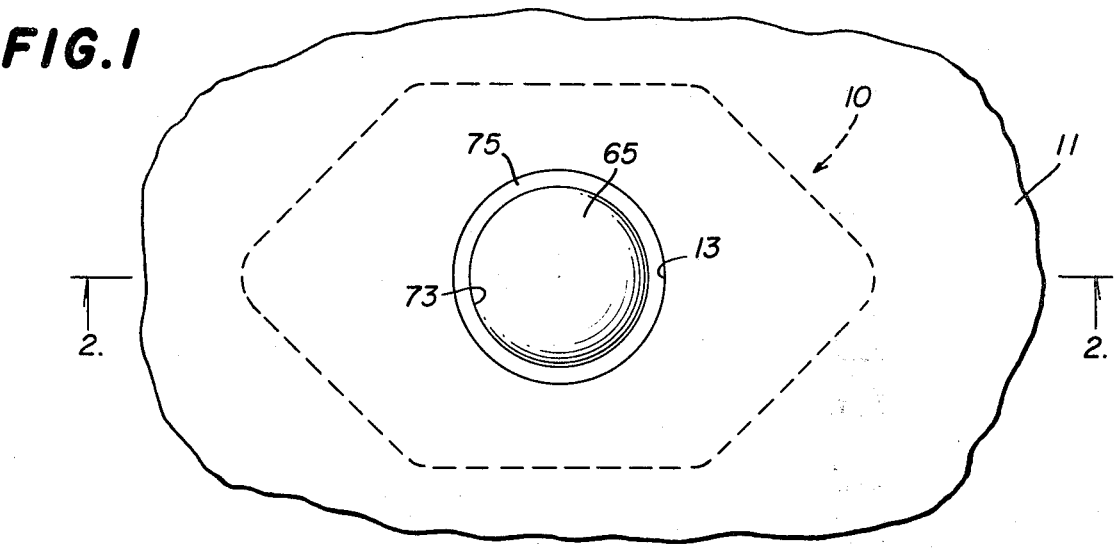
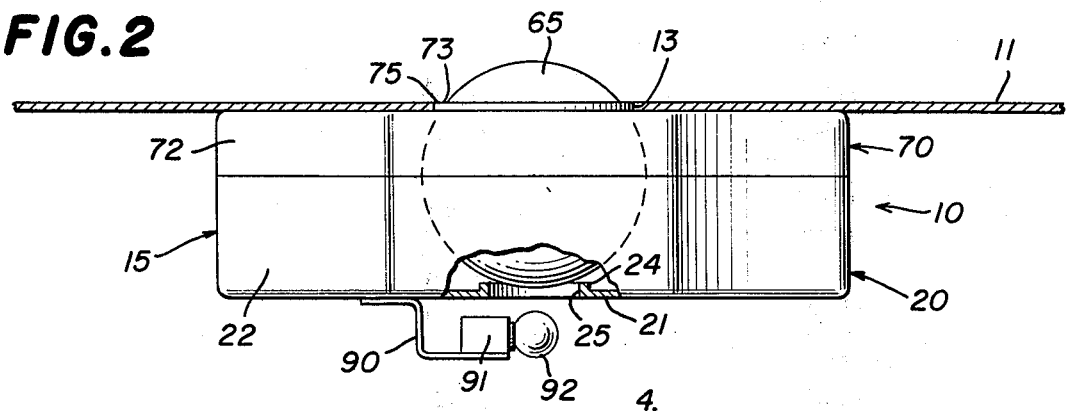
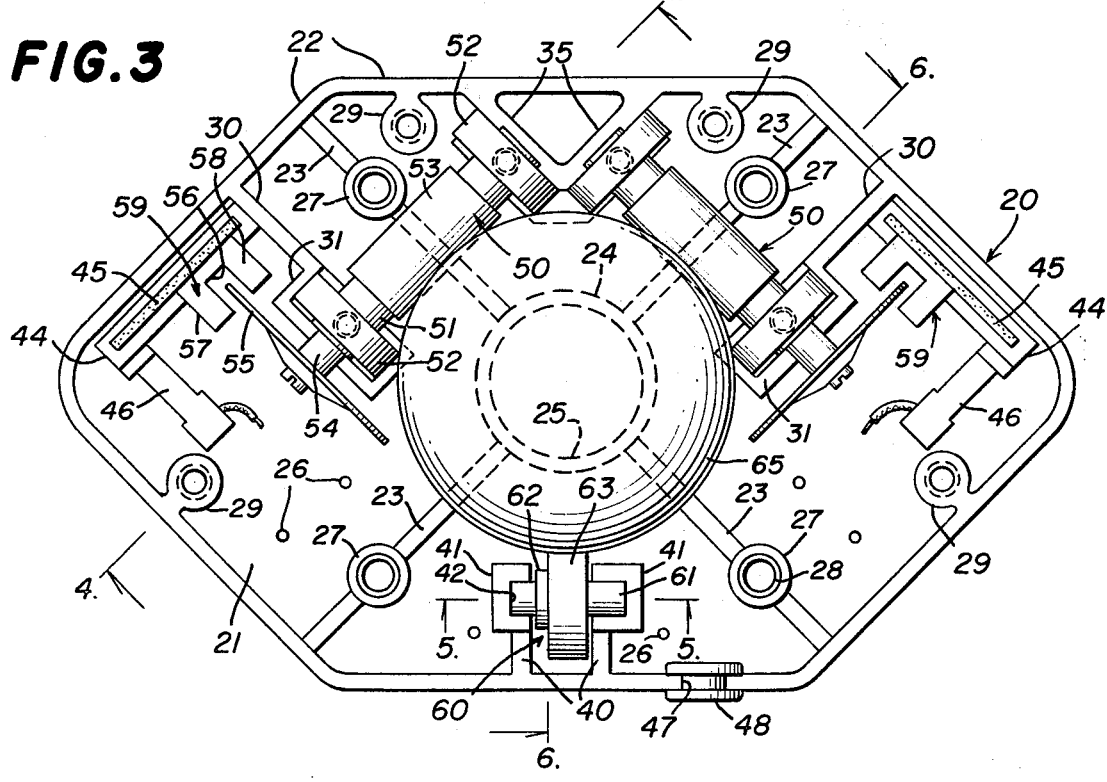

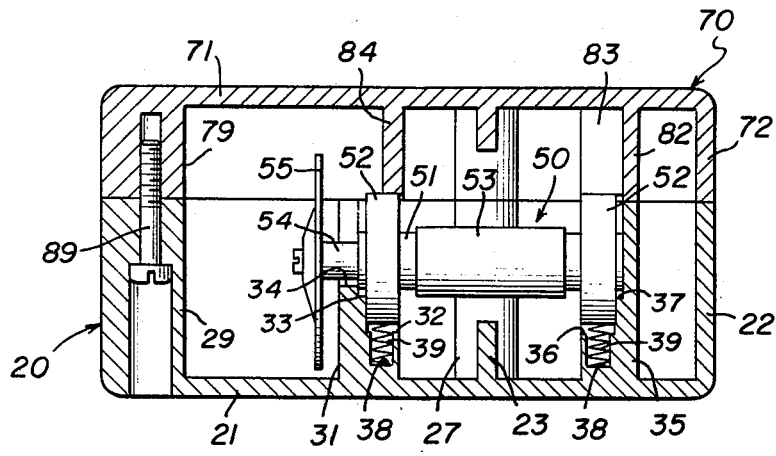
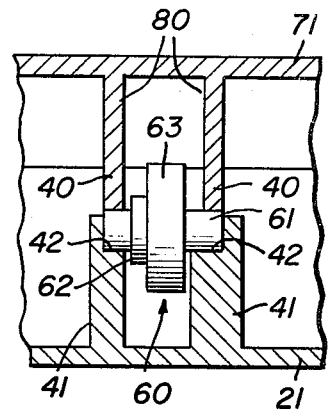
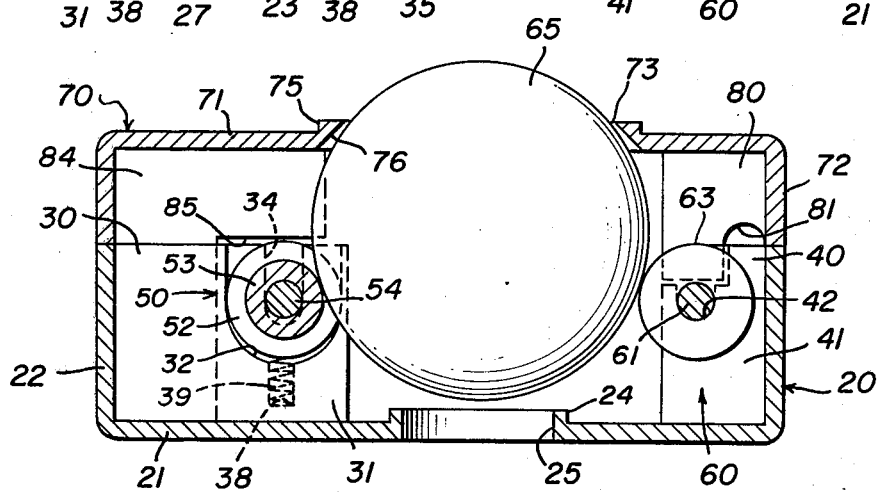
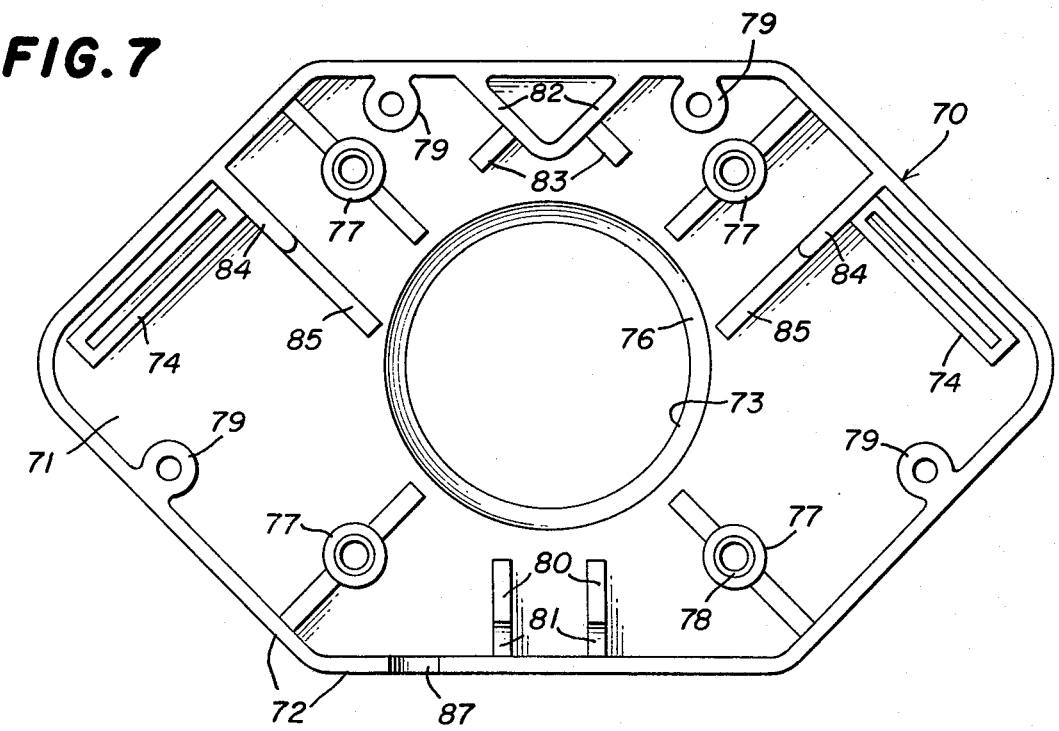

TRACKBALL DEVICE

BACKGROUND OF THE INVENTION

The present invention relates to a position control device of the type commonly referred to as a trackball device. Such devices are used, for example, to control the movement of a cursor of a video display, as in a video game.

Trackball devices include a housing having a circular opening therein and carrying a plurality of rotatable supports, at least two of which are respectively rotatable about orthogonally related axes. A ball is loosely seated on the supports with a portion of the ball projecting through the opening for access by a user, so that the user can manually rotate the ball. The rotatable supports respectively respond to the corresponding components of rotational movement of the ball. The orthogonally related supports are respectively connected to signal generating devices for producing signals indicative of the speed and direction of rotation of the supports. The two orthogonally related supports respectively correspond to the X and Y directions of movement of the cursor, so that the speed and direction of movement of the cursor in the X and Y directions correspond respectively to the speed and direction of rotation of the associated supports.

In prior trackball devices the axes of rotation of the supports are fixed, and proper operation of the device requires manufacture of the parts to very exacting tolerances. Thus, for example, the ball must not engage the housing lest it impede rotation thereof, yet the gap between the ball and the housing around the perimeter of the ball opening must not be too great, so as to avoid pinching of the user's fingers between the ball and the housing. Manufacture of the trackball device to the required tolerances is quite costly, since it precludes the use of certain inexpensive materials and fabrication techniques.

Furthermore, prior trackball devices have tended to be unduly rattly and have exhibited poor shock and impact resistance.

SUMMARY OF THE INVENTION

It is a general object of this invention to provide an improved trackball device which avoids the disadvantages of prior devices, while at the same time offering additional structural and operating advantages.

An important object of this invention is the provision of a trackball device which affords reliable operation without the necessity for very close tolerances in the manufacture of the parts.

It is another object of this invention to provide a trackball device which exhibits improved shock and impact resistance and smooth operation.

Another object of this invention is to provide a trackball device which affords illumination of the ball.

These and other objects of the invention are attained by providing in a trackball position control device including a housing having a circular opening therein, a plurality of rotatable supports in the housing, at least first and second ones of which are respectively rotatable about orthogonally related axes, and a ball seated on the supports with a portion of the ball projecting through the opening for manual rotation by a user, wherein each of the first and second supports rotates in response to a corresponding component of rotational movement of the ball for generating control signals, the improvement comprising: mounting means accommodating movement of the first and second supports in directions toward and away from the opening, and bias means carried by the housing and resiliently urging the first and second supports toward the opening.

The invention consists of these and other novel features and a combination of parts hereinafter fully described, illustrated in the accompanying drawings, and particularly pointed out in the appended claims, it being understood that various changes in the details may be made without departing from the spirit or sacrificing any of the advantages of the invention.

BRIEF DESCRIPTION OF THE DRAWINGS

FIG. 1 is a fragmentary top plan view of a portion of a support surface carrying a trackball device constructed in accordance with and embodying the features of the present invention;

FIG. 2 is a view in vertical section taken along the line 2—2 in FIG. 1, and illustrating the trackball device in elevation with a portion of the device broken away;

FIG. 3 is an enlarged top plan view of the trackball device of FIG. 2 with the cover thereof removed;

FIG. 4 is a view in vertical section taken along the line 4—4 in FIG. 3, with the cover in place;

FIG. 5 is a fragmentary view in vertical section taken along the line 5—5 in FIG. 3, with the cover in place;

FIG. 6 is a view in vertical section taken along the line 6—6 in FIG. 3, with the cover in place; and FIG. 7 is an enlarged bottom plan view of the top cover of the trackball device of FIG. 2.

DESCRIPTION OF THE PREFERRED EMBODIMENT

Referring now to FIGS. 1 and 2 of the drawings, there is illustrated a trackball device, generally designated by the numeral 10, mounted beneath a support wall 11, which may be the top wall of a video game, for example. The support wall 11 has a circular aperture 13 therein for a purpose to be explained more fully below.

The trackball device 10 includes a housing 15 which comprises a base 20 and a cover 70 fixedly secured together, the housing 15 being secured to the support wall 11 by suitable means (not shown). Supported within the housing 15 are two control support assemblies 50 and a support 60 (see FIG. 3) which cooperate to support thereon a ball 65 in a well known manner.

Referring now also to FIGS. 3 through 6 of the drawings, the base 20 includes a generally hexagonal flat bottom wall 21 integral around the peripheral edge thereof with an upstanding side wall 22. Formed on the bottom wall 21 and extending therealong from the side wall 22 toward the center of the bottom wall 21 are four equiangularly spaced-apart webs 23, which terminate at a short upstanding circular rim 24 which surrounds a circular opening 25 formed in the bottom wall 21 centrally thereof. The bottom wall 21 may be provided with a plurality of drain holes 26 therein, several of which are illustrated in FIG. 3. Respectively integral with the webs 23 and projecting upwardly from the bottom wall 21 substantially perpendicular thereto are four hollow posts 27, each having a reduced diameter upper end portion 28. Also integral with the side wall 22 and projecting upwardly from the bottom wall 21 substantially normal thereto are four spaced-apart hollow cylindrical screw bushings 29.

The base 20 is also provided with two upstanding support walls 30 disposed substantially perpendicular to each other and to the bottom wall 21, each of the support walls 30 being provided with a thickened portion 31 at the inner end thereof. Each of the thickened portions 31 has formed in one side surface thereof a generally U-shaped recess 32 (see FIGS. 4 and 6), each recess 32 in turn having formed in the rear wall thereof a smaller U-shaped recess 33 and a U-shaped notch 34 extending downwardly from the top of the thickened portion 31. The base 20 is also provided with two upstanding support walls 35 which are respectively parallel to the support walls 30 and spaced a predetermined distance therefrom, the support walls 35 being integral with each other and with the adjacent portion of the side wall 22. Formed in the inner surface of each of the support walls 35 is a generally U-shaped recess 36, which in turn has formed in the rear wall thereof a smaller U-shaped recess 37 (see FIG. 4). Each of the support wall thickened portions 31 and the support walls 35 has formed therein at the bottom of the U-shaped recess 32 or 36 a cylindrical bore 38, which extends substantially perpendicular to the bottom wall 21 and receives therein an associated helical compression spring 39, which projects upwardly a predetermined distance above the bottom of the associated recess 32 or 36 (see FIGS. 3, 4 and 6).

Also formed on the bottom wall 21 are two spaced-apart, parallel upstanding support walls 40, each extending inwardly from the side wall 22 and being provided at its inner end with a thickened portion 41. Each of the thickened portions 41 has a generally U-shaped notch or recess 42 formed in the inner surface thereof at the upper end thereof. Also formed on the bottom wall 21 respectively adjacent to the two support walls 30 are two rectangular channels 44 for respectively receiving the lower ends of two upstanding circuit boards 45. Each of the circuit boards 45 has electrical components thereon, each board 45 preferably being a printed circuit board and being connected by a connector 46 and associated wiring to an associated source of electric power and control circuitry (not shown). Formed in the upper edge of the side wall 22 is a semi-cylindrical notch 47 for receiving therein a grommet 48 through which the electrical wiring can pass.

The two control support assemblies 50 are substantially identical in construction and, therefore, only one will be described in detail. Each control support assembly 50 includes an elongated cylindrical shaft 51, the opposite ends of which are respectively journaled in bearings 52, such as roller bearings. The bearings 52 are respectively received in the U-shaped recesses 32 and 36 of opposed support walls 30 and 35, so that the springs 39 respectively bear against the bearings 52.

It will be appreciated that when the bearings 52 are thus mounted in place, the opposite ends of the shaft 51 which project a slight distance beyond the outer surfaces of the bearings 52, are respectively accommodated by the U-shaped recesses 33 and 37 (see FIG. 4). The shaft 51 has an engagement sleeve 53 fixedly secured therearound between the bearings 52 for engagement with the associated ball 65, as will be more fully explained below. The shaft 51 has a reduced diameter extension 54 extending coaxially therefrom at one end thereof and received in the U-shaped notch 34, the extension 54 having fixedly secured thereto at the distal end thereof a circular code wheel 55. The code wheel 55 is a thin, disk-like wheel which has a plurality of generally rectangular apertures (not shown) therethrough equiangularly spaced apart therearound adjacent to the periphery thereof, in a well known manner.

The code wheel 55 is dimensioned so that the apertured portion thereof projects into a slot 56 between the spaced-apart portions 57 and 58 of a photoelectric transducer 59 which is carried by the associated one of the circuit boards 45 (see FIG. 3). The transducer 59 is of standard construction and preferably includes in the portion 57 two vertically aligned light sources, such as LED's, and in the portion 58 two vertically aligned light responsive elements, such as phototransistors. In operation, the light beams from the LED's pass through the apertures and the code wheel 55 to the phototransistors to provide a series of pulse signals as the code wheel 55 rotates.

The support 60 includes an elongated shaft 61, the opposite ends of which are respectively fixedly secured in the recesses 42 of the support walls 40. Carried by the shaft 61 is a bearing 62 on which a wheel 63 is freely rotatable (see FIGS. 3, 5 and 6).

In use, the engagement sleeves 53 of the control support assemblies 50 and the wheel 63 of the support 60 define a three-point support for the ball 65, the parts being arranged so that the three points of engagement with the ball 65 define a circle having a diameter slightly less than the diameter of the ball 65 and lying in a plane substantially parallel to the bottom wall 21 of the base 20. Preferably, the ball 65 is relatively heavy so that, in normal use, gravity maintains it firmly in engagement with the sleeves 53 and the support wheel 63.

Referring now also to FIG. 7, the cover 70 of the housing 15 is shaped and dimensioned to mate with the base 20, the cover 70 having a generally hexagonal flat planar top wall 71, integral around the perimeter thereof with a depending side wall 72. Formed in the top wall 71 centrally thereof is a circular opening 73. Formed in the inner surface of the top wall 71 are two rectangular channels 74 for respectively receiving the upper edges of the circuit boards 45, as will be explained below. An upstanding circular rim 75 surrounds the opening 73, and the opening 73 has a frustoconical inner edge surface 76 which tapers downwardly and radially outwardly from the inner edge of the rim 75 (see FIGS. 6 and 7). Integral with the top wall 71 and depending therefrom are four spaced-apart hollow cylindrical posts 77, each having an annular recess 78 on the inner surface thereof at the lower end thereof. Integral with the side walls 72 and depending from the top wall 71 substantially normal thereto are four screw bushings 79 having screw-receiving bores extending axially thereinto from the lower ends thereof.

Depending from the top wall 71 substantially normal thereto are two spaced-apart retaining walls 80, each projecting downwardly beneath the bottom edge of the side wall 72 and having formed therein adjacent to the side wall 72 an arcuate recess 81 for accommodating associated wiring. Depending from the top wall 71 substantially normal thereto on the opposite side of the opening 73 from the retaining walls 80 are two support walls 82, disposed perpendicular to each other and each provided with a retaining flange 83 extending therefrom normal thereto and to the top wall 71. Also integral with the top wall 71 and depending therefrom normal thereto are two support walls 84, disposed substantially perpendicular to each other and each provided at the inner end thereof with a vertically offset surface 85 along the bottom edge thereof (see FIG. 6). The side wall 72 has a semi-cylindrical recess 87 therein for mating with the recess 47 in the base side wall 22 and enclosing the grommet 48.

In assembly of the trackball device 10 the springs 39 are first inserted in the bores 38, the support 60 is mounted in the notches 42 and the control support assemblies 50 are mounted in the recesses 32 and 36 on top of the springs 39. The bottoms of the circuit boards 45 are inserted in the channels 44 and the associated wiring bundled through the grommet 48. Then the ball 65 is seated on the three-point support provided by the support assemblies 50 and the support 60. The cover 70 is then mounted in place on the base 20, with the upper edges of the circuit boards 45 received in the channels 74, and the reduced-diameter upper end portions 28 of the base posts 27 being received in the recessed lower ends 78 of the cover posts 77. Screws 89 (see FIG. 4) are then respectively inserted in the bushings 29 and threadedly engaged with the bushings 79 which are respectively disposed in axial alignment with the bushings 29, thereby securely to fasten the cover 70 to the base 20.

It will be appreciated that the springs 39 respectively resiliently urge the bearings 52 upwardly from the bottoms of the recesses 32 and 36, so that the tops of the bearings 52 project a slight distance upwardly above the upper ends of the support walls 30, this projection being accommodated and limited by the offset surfaces 85 of the cover support walls 84 (see FIG. 6). The lower ends of the retaining walls 80 are disposed very closely adjacent to the upper ends of the thickened portions 41 of the support walls 40 to prevent accidental removal of the support 60 from the notches 42 (see FIGS. 5 and 6).

The ball 65 is dimensioned so that a portion thereof projects upwardly through the opening 73 in the cover 70 and through the aperture 13 in the support wall 11. In this regard, the rim 75 of the cover 70 may also project upwardly through the support wall aperture 13. The protruding portion of the ball 65 is accessible by a user for manual rotation thereof in the usual manner. The free seating of the ball 65 on the control support assemblies 50 and the support 60 permit rotation thereof is any direction. Each of the sleeves 53 of the wheel 63 will, by frictional engagement with the ball 65, be rotated in response to a component of the rotational movement of the ball 65 about an axis parallel to the axis of the sleeve 53 or the wheel 63. The resulting rotation of the code wheels 55 produces control signals which control movement of a cursor or other element in an X-Y plane, the speed and direction of movement in the X or Y direction being proportional to the speed and direction of rotation of the corresponding one of the support assemblies 50.

It is a significant aspect of the present invention that the springs 39 resiliently urge the support assemblies 50 and the ball 65 upwardly toward the opening 73 in the cover 70, this upward movement being limited by the offset surfaces 85 of the support walls 84 so that the ball 65 will be spaced a slight distance from the edge of the opening 73. An advantage of the present invention is that, even if the tolerance of the parts is such that the ball 65 touches the cover 70 at the opening 73, the movement of the control support assemblies 50 away from the opening 73 against the urging of the springs 39 in directions substantially perpendicular to the top wall 71, which movement is accommodated by the recesses 32 and 36, permits depression of the ball 65 when it is engaged by the user's hands so that it can be rotated. Accordingly, it will be understood that the parts can be fabricated without critical tolerances. Also, the springs 39 serve to cushion the parts of the trackball device 10 against the shock of sudden impacts. The resilience of the springs 39 also provides a smooth and substantially rattle-free operation of the trackball device 10.

Referring to FIG. 2 of the drawings, there may be mounted on the outside of the bottom wall 21 of the base 20 a generally Z-shaped bracket 90 for supporting a socket 91 for an electric light bulb 92, the bulb 92 preferably being positioned beneath the opening 25 in the base bottom wall 21 for illumination of the ball 65. In accordance with this aspect of the invention, the ball 65 may be formed of a light-transmitting material, such as transparent or translucent plastic or the like, so that the light from the bulb 92 may be viewed by a user through a ball 65.

It will be appreciated that if water or other fluid should get inside the housing 15, such as if a drink is spilled on the trackball device 10, the fluids will readily drain through the drain holes 26. In like manner, the hollow posts 27,77 will drain fluids directly from the top of the housing 15 so that they do not enter the interior of the housing 15.

In a constructional model of the present invention, the base 20 and the cover 70 are each preferably of unitary, one-piece construction, the parts preferably being molded of plastic. The engagement sleeves 53, the shaft 61, the wheel 63 and the outer surfaces of the bearings 52 are all preferably formed of a plastic resin, such as that sold by E. I. DuPont de Nemours & Co. under the trademark "DELRIN".

From the foregoing, it can be seen that there has been provided an improved trackball device, which permits free operation of the ball without the necessity of close tolerances in the manufacture of parts, this improved construction also affording a cushioned operation of the device.

I claim:

1. In a trackball position control device including a housing having a circular opening therein, a plurality of rotatable supports in the housing, at least first and second ones of which are respectively rotatable about orthogonally related axes, and a ball seated on and supported by the supports with a portion of the ball projecting through the opening for manual rotation by a user, wherein each of the first and second supports rotates in response to a corresponding component of rotational movement of the ball for generating control signals, the improvement comprising: mounting means accommodating movement of the first and second supports in directions toward and away from the plane of the opening and preventing movement of the first and second supports in directions parallel to the plane of the opening, and bias means carried by the housing and resiliently urging the first and second supports toward the plane of the opening.

2. The trackball device of claim 1, wherein said mounting means and the ball and the portions of the supports engageable with the ball are all formed of plastic.

3. The trackball device of claim 1, wherein the supports are responsive to said bias means for urging the ball toward the plane of the opening.

4. The trackball device of claim 1, wherein said bias means urges the first and second supports in directions substantially perpendicular to the plane of the opening in the housing.

5. The trackball device of claim 1, wherein said bias means includes separate bias means respectively associated with the first and second supports.

6. The trackball device of claim 1, wherein each of the first and second supports comprises a shaft rotatably mounted in a pair of bearings, said bias means being engageable with said bearings.

7. The trackball device of claim 1, wherein said bias means comprises a plurality of helical compression springs.

8. The trackball device of claim 1, wherein said bias means urges the first and second supports and the ball to a normal rest position, said mounting means accommodating limited movement of the ball and the first and second supports from the rest position in a direction away from the plane of the opening in the housing.

9. The trackball device of claim 1, wherein said mounting means includes means limiting the movement of the first and second supports in directions toward and away from the plane of the housing opening.

10. The trackball device of claim 1, and further including illumination means carried by said housing for illuminating the ball.

11. The trackball device of claim 10, wherein the ball is formed of a light-transmitting material so that light from said illumination means is visible to a user through the ball.

12. In a trackball position control device including a housing rotatably supporting a ball, with a portion of the ball projecting through an aperture in the housing for manual rotation by a user, the improvement comprising: an opening in the housing beneath the ball, illumination means carried by the housing and disposed externally thereof for illuminating the ball through said opening, the ball being formed of light-transmitting material so that the light from said illumination means is visible to a user through the ball.

* * * * *